Aug. 28, 1934.  H. H. McKEE  1,971,460
METHOD OF TREATING MEAT
Filed Nov. 2, 1932   3 Sheets-Sheet 1

Harry H. McKee
INVENTOR

Aug. 28, 1934.　　　　H. H. McKEE　　　　1,971,460
METHOD OF TREATING MEAT
Filed Nov. 2, 1932　　　3 Sheets-Sheet 2

Harry H. McKee
INVENTOR

Aug. 28, 1934.  H. H. McKEE  1,971,460
METHOD OF TREATING MEAT
Filed Nov. 2, 1932   3 Sheets-Sheet 3

Harry H. McKee
INVENTOR

Patented Aug. 28, 1934

1,971,460

UNITED STATES PATENT OFFICE 1,971,460

METHOD OF TREATING MEAT

Harry H. McKee, Chicago, Ill., assignor to Industrial Patents Corporation, Chicago, Ill., a corporation of Delaware Application November 2, 1932, Serial No. 640,800

5 Claims. (Cl. 99—9)

This invention relates to a method of treating hams. An object of the invention is to improve the shape and appearance of the conventional ham of commerce. Other objects of the invention will be apparent from the description and claims which follow.

Due primarily to the shape and the scanty distribution of flesh, the shank of the ham is the least desirable portion. The present invention contemplates the increase in the weight of the center slices of the ham at the expense of the shank. The invention further contemplates a blocky shaped ham comparable in shape to the shankless ham which is ordinarily produced by the simple expedient of cutting off the shank or a portion thereof.

The present invention permits the production of a shankless ham without the removal or waste of any of the edible portion of the ham.

Referring now to the drawings.

Figure 1:
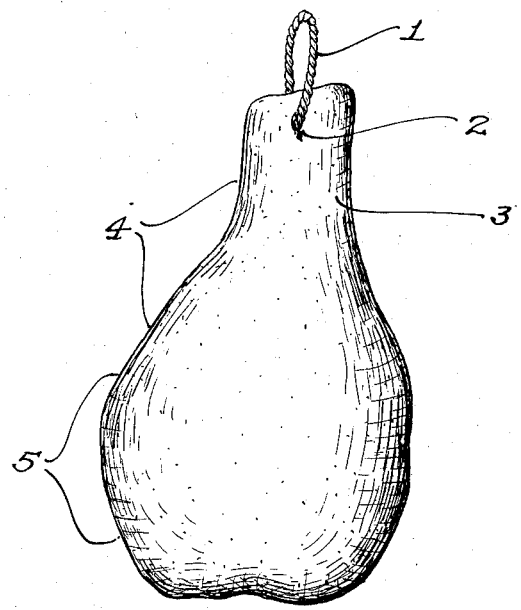
Figure 1 is a diagrammatic view showing the shape of a ham from which the shank has not been removed and which has not been treated in accordance with the present invention.

It will be noted by reference to Figure 1 that a ham is conventionally hung by a string 1 threaded through an opening 2 in the shank 3 of the ham. It will be noted that the shank 3 is comparatively long and that there is a gradual tapering as at 4, the thick portion of the ham 5; namely, the region of the middle slices, being undesirably short in length.

Figure 2:
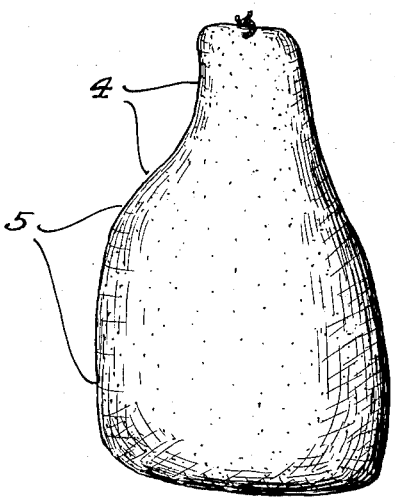
Figure 2 is a diagrammatic view showing the shape of a ham which has been treated in accordance with the present invention.

It will be seen in Figure 2 that the region of the center slices is large in proportion to the length of the shank.

For convenience, two variations of the present invention will be discussed separately.

Figure 3:
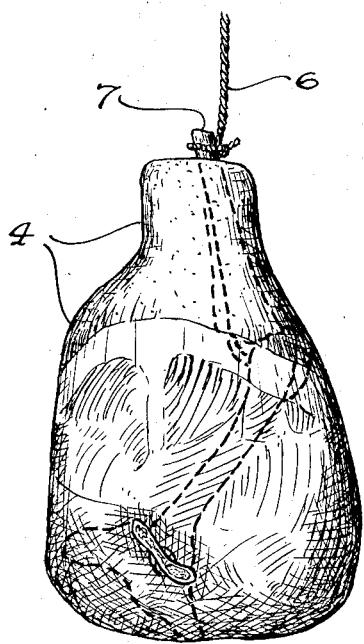
Figure 3 is a perspective view of a ham showing the skeletal structure diagrammatically, the ham being treated in accordance with the present invention by one embodiment thereof.
Figure 4:
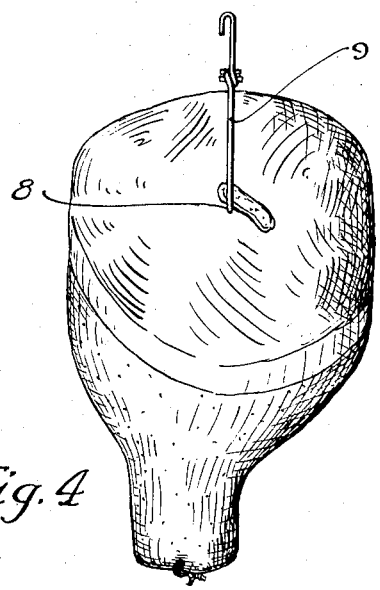
Figure 4 is a view of the flesh side of a ham being treated in accordance with another embodiment of the present invention.
Figure 5:
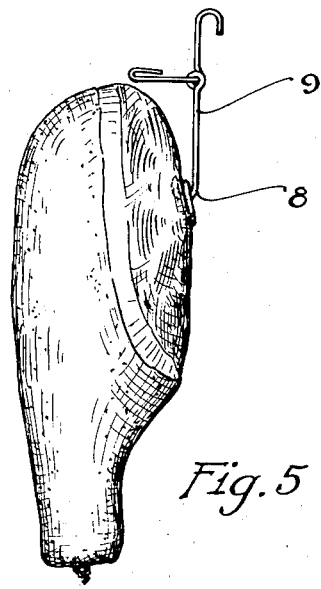
Figure 5 is a side view of the ham shown in Figure 4.

The method disclosed in Figure 3 may be distinguished from that disclosed in Figures 4 to 8 inclusive. In the variation of the method shown in Figure 3 the ham is cut from the carcass in the usual way, all meat, skin and tendons at the hock joint are cut loose from the bone preferably while the hog carcass is warm with animal heat. The ham is then suspended by the femur as shown in Figure 3, a cord 6 being attached to the exposed portion of the bone 7 in any desired manner. Any other hanging means may be substituted for the cord 6. The weight of the ham causes readjustment of the portion shown diagrammatically in Figure 3, forcing the meat up into the area 4. This tendency to block out this portion of the ham is augmented by the meat shrinking away from the bone 7 and flaccidly falling.

Figure 6:
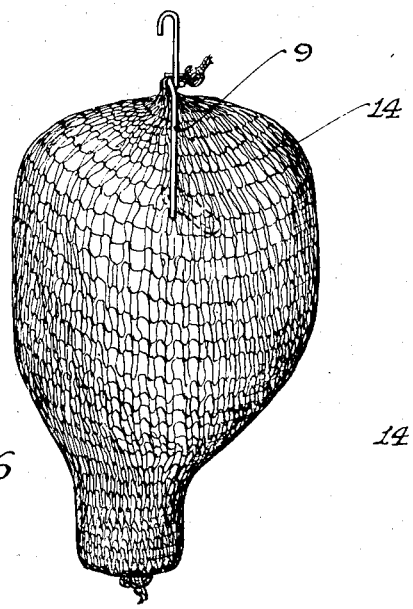
Figure 6 is a perspective view showing the manner of attaching the stockinet when used in combination with the mode of hanging shown in Figures 4 and 5.
Figure 7:
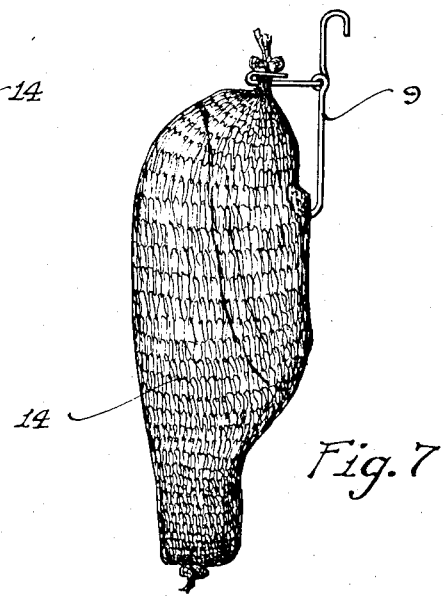
Figure 7 is a side view of Figure 6.
Figure 8:
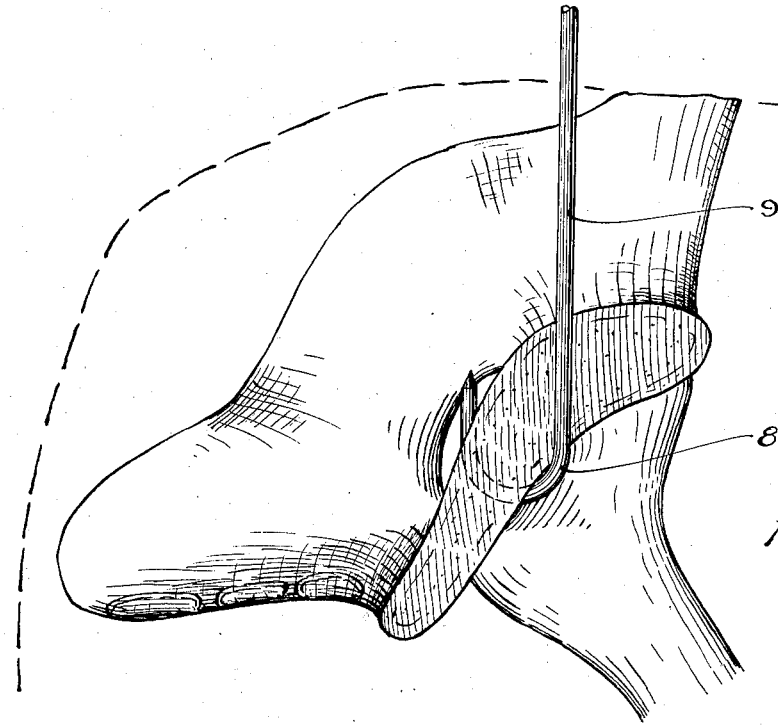
Figure 8 is a detail showing the manner of hooking the aitchbone in accordance with the practice of the method shown in Figures 4, 5, 6 and 7.
Figure 9:
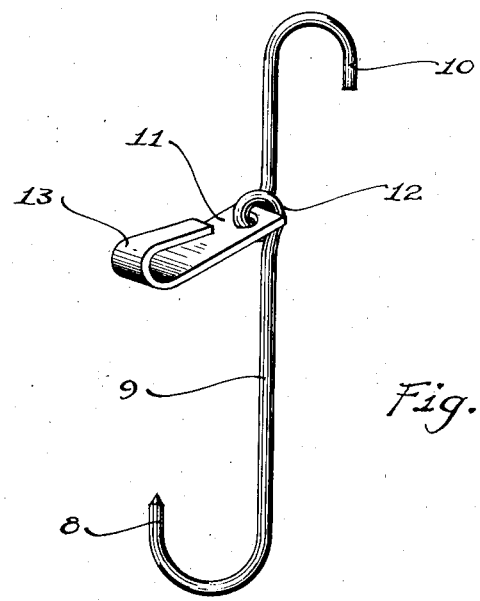
Figure 9 is an enlarged view of the hanger shown in Figures 4, 5, 6 and 7.

A similar result is secured by the other variation in the method, namely that disclosed in Figures 4 to 8 inclusive. In this variation of the method a hook member as 8 is secured to the aitchbone, preferably while the ham is yet warm with animal heat. Here again the weight of the product is suspended by the skeletal structure and not by direct attachment to the flesh. In this variation of the method, I prefer to use an instrument such as is shown in Figure 9. This hanger mechanism is composed of rod 9 provided with product hook 8 and suspension hook 10, rod 11 is pivotally affixed to rod 9 at 12 and provided with hook 13 to which stockinet 14 may be attached as is shown in Figures 6 and 7. This serves to hold the stockinet tightly about the product and assists in forcing up the shank meat into the body of the ham.

When the product is suspended by the aitchbone, it is preferable to remove from one and one-half to two inches of the shank bone and then tie the skin at the shank end with a suitable cord so that as shrinking takes place during the process of smoking and drying, the skin draws together, more or less sealing the open end of the shank. Although the device shown in Figure 9 is a desirable device to use for the purpose of suspending the ham by the aitchbone it will be understood that any other suitable hanging device may be used. The support of the entire weight of the ham by the aitchbone with the butt up permits the meat, skin and cord on the shank end to shrink to a more natural shape and position more nearly resembling the shape and position on the live hog and permitting the meat muscles of the butt and body part of the ham to contract to a more natural position.

The result of either method of handling is to increase the cut out value for the dealer who slices smoked hams, due to the fact that the weight of the shank and butt is decreased and the weight of the center of the ham increased. The old conventional method of hanging hams consists of stringing the ham through the meat, skin and cord at the shank end and hanging the ham shank up in an unnatural position, compared with the position of the hams on the live hogs. This unnatural position moves the muscles out of their natural position placing tension on the meat muscles due to the stretching of them while being smoked or dried and permanently fixing them in that relationship.

I claim:

1. The method of treating hams which consists in affixing a support to the skeletal structure of the ham and permitting the ham to depend therefrom.

2. The method of treating hams which consists in releasing the non-skeletal material from the bone at the shank end, suspending by means of said bone during the smoking and drying operations and removing the projecting bone.

3. The method of treating hams which comprises suspending the same by the aitchbone.

4. The method of treating hams which comprises loosening the non-skeletal material from the shank bone, removing a portion of the shank bone and suspending the ham from the aitchbone.

5. The method of treating hams which comprises loosening the non-skeletal material from the shank bone, removing a portion of the shank bone, encasing in stockinet and suspending the ham from the aitchbone.

HARRY H. McKEE.